United States Patent [19]

Tanaka

[11] Patent Number: 4,862,338
[45] Date of Patent: Aug. 29, 1989

[54] RINGING CHOKE CONVERTER USING SINGLE SWITCHING ELEMENT

[75] Inventor: Kiichi Tanaka, Hanno, Japan

[73] Assignee: Shindengen Kogyo Kabushiki Kaisha, Tokyo, Japan

[21] Appl. No.: 98,563

[22] Filed: Sep. 21, 1987

[30] Foreign Application Priority Data

Sep. 29, 1986 [JP] Japan .................................. 61-230260
Sep. 29, 1986 [JP] Japan .................................. 61-230261
Sep. 29, 1986 [JP] Japan .................................. 61-230262

[51] Int. Cl.$^4$ ........................................... H02M 3/335
[52] U.S. Cl. ........................................ 363/19; 363/97
[58] Field of Search ................... 363/18, 19, 97, 131; 331/112, 113 R, 117 R

[56] References Cited

U.S. PATENT DOCUMENTS

| | | | |
|---|---|---|---|
| 4,443,838 | 4/1984 | Yamada | 363/19 |
| 4,654,771 | 3/1987 | Stasch et al. | 363/19 |
| 4,763,236 | 8/1988 | Usui | 363/19 |

FOREIGN PATENT DOCUMENTS

| | | | |
|---|---|---|---|
| 0059078 | 4/1984 | Japan | 363/19 |
| 0141168 | 7/1985 | Japan | 363/19 |

Primary Examiner—Peter S. Wong
Assistant Examiner—Kristine Peckman
Attorney, Agent, or Firm—Emmanuel J. Lobato; Robert E. Burns

[57] ABSTRACT

A ringing choke converter which comprises an output transformer having a primary winding, a secondary winding, and a feedback winding and/or a control winding, a main switching transistor having its collector connected to the primary winding and its base and emitter connected to the feedback winding, and a rectifying diode connected to the secondary winding. In accordance with the present invention, a control transistor is connected between the base and emitter of the main transistor; a time constant circuit composed of a resistor and a capacitor is connected across the feedback winding or control winding; the connection point between the resistor and the capacitor is connected to the base of the control transistor; and an adjusting circuit for adjusting the charging time constant of the capacitor in accordance with the output voltage is connected to the connection point.

12 Claims, 8 Drawing Sheets

Fig. 3
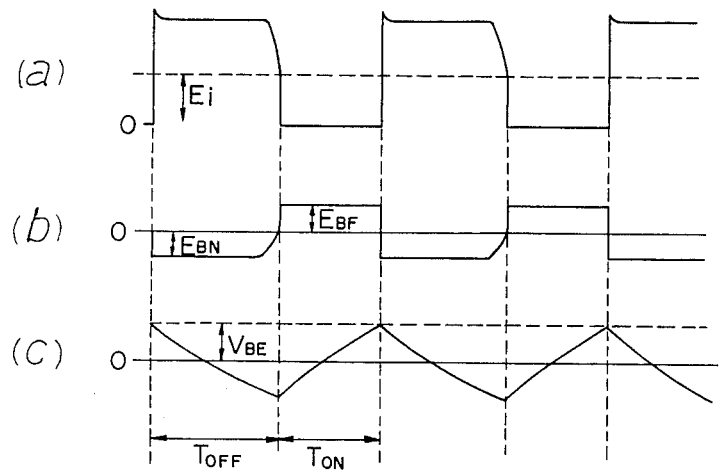
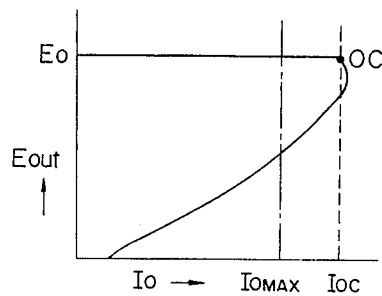
Fig. 4
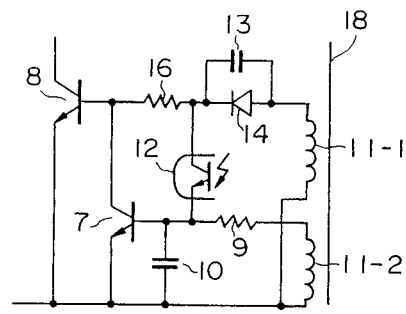
Fig. 5

RINGING CHOKE CONVERTER USING SINGLE SWITCHING ELEMENT

BACKGROUND OF THE INVENTION

The present invention relates to improvement in or relating to an output control circuit of a simple-structured ringing choke converter (hereinafter referred to simply as RCC).

Conventional converter of the type having voltage convertion function as mentioned below but not having any output control function.

SUMMARY OF THE INVENTION

An object of the present invention is to provide an inexpensive ringing choke converter which efficiently performs output voltage control function and overcurrent limiting function.

In accordance with the present invention, there is provided a ringing choke converter comprising: an output transformer having a primary winding, a secondary winding, and a feedback winding and/or a control winding, a main switching transistor having its collector connected to the primary winding and its base and emitter connected to the feedback winding, and a rectifying diode connected to the secondary winding, characterized in that a control transistor is connected between the base and emitter of the main transistor, a time constant circuit composed of a resistor and a capacitor is connected across the feedback winding or control winding, the connection point between the resistor and the capacitor is connected to the base of the control transistor, and an adjusting circuit for adjusting the charging time constant of the capacitor in accordance with the output voltage is connected to the connection point.

The adjusting circuit can be formed by a photocoupler which supplies a current proportional to the output of an output voltage detecting section.

The ringing choke converter of the present invention can be modified as described in detail below.

BRIEF DESCRIPTION OF THE DRAWINGS

The present invention will be described in detail below in comparison with prior art with reference to the accompanying drawings; in which:

FIG. 3 shows waveform diagrams explanatory of the operations of the embodiment of FIG. 2;

FIGS. 4 and 6 show a characteristic diagram explanatory of the characteristic of the embodiment of FIG. 2;

FIG. 5 is a circuit diagram illustrating a main part of another embodiment of the present invention;

DETAILED DESCRIPTION

To make differences between prior art and the present invention, an example of prior art will first be described.

Figure 1:
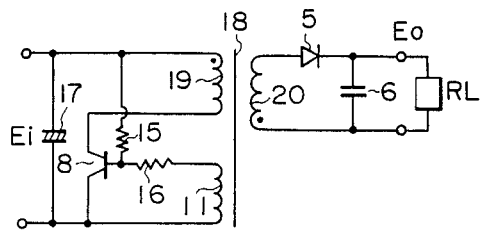
FIG. 1 is a circuit diagram illustrating an example of conventional ringing choke converters.

FIG. 1 is a basic circuit diagram of prior art, in which upon application of an input power source voltage Ei, a main switching transistor 8 is turned ON via a starting resistor 15 and a certain base current flows to the main transistor 8 by virtue of a voltage induced in a feedback winding 11 of an output transformer 18 and a base resistor 16. In this instance, a voltage induced in a secondary winding 20 is blocked by a rectifying diode 5, causing no current flow to a smoothing capacitor 6 and a load RL. At this stage the input power source voltage Ei is applied, with practically no loss, to a primary winding 19 of the transformer 18 and a current flowing through the primary winding 19, that is, a collector current of the transistor 8 linearly increases, thus storing energy in the primary winding 19. Since the base current of the transistor 8 is fixed, however, its collector current, when having reached a certain value, will no longer increase, after which the voltage which is induced in the primary winding 19 decreases, and accordingly the base current also decreases. By such a feedback regenerating action, the transistor 8 is quickly turned OFF. At the same time, a voltage is induced in the secondary winding 20 of the transformer 18 in a direction in which to conduct the diode 5 and the energy stored in the primary winding 19 is supplied via the diode 5 to the capacitor 6 and the load RL. In a short time the transistor 8 is turned ON again and the diode 5 is cut off, but the current supply to the load RL is sustained by discharging of the capacitor 6, after which such operations as mentioned above are repeated. However, such a conventional circuit possesses the above-mentioned voltage conversion function but has no output control function.

The present invention will hereinafter be described with reference to the accompanying drawings.

Figure 2:
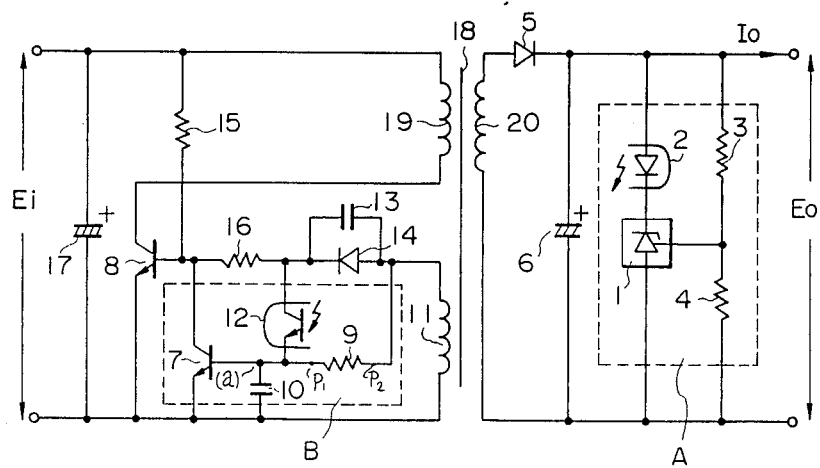
FIG. 2 is a circuit diagram illustrating an embodiment of the present invention.

FIGS. 2 and 3 are a circuit diagram showing an embodiment of the present invention and a diagram showing waveforms which occur at respective parts therein. The parts corresponding to those in the prior art example are identified by the same reference characters. Reference characters A and B indicate a voltage detecting section and a control circuit section which form the principal part of the present invention. The voltage detecting section A comprises a voltage detector 1 having incorporated therein a reference voltage source, a light emitting section 2 of a photocoupler, and resistors 3 and 4 which divide an output voltage (Eo). In the control circuit section B reference number 7 indicates a control transistor connected between the base and emitter of the main transistor 8, and 9 and 10 a resistor and a capacitor which form a time constant circuit connected across the feedback winding 11, the connection point (a) between the resistor 9 and the capacitor 10 being connected to the base of the control transistor 7. Reference number 12 designates a light receiving section of the photodetector connected between one end of the feedback winding 11 and the connection point (a), for adjusting the charging time constant of the capacitor 10. Reference number 13 denotes a capacitor for improving the turn-OFF characteristic of the main transistor 8 and 14 a diode for blocking an echo of a base starting current. The basic operation of this circuit is substantially identical with the operation of the prior art, and hence will not be described. Next, the operation of the control circuit section B will be described with reference to FIG. 3.

[Voltage Control Operation]

In FIG. 3, (a) shows a voltage ($V_{CE}$) waveform of the main transistor 8, (b) a voltage waveform of the feedback (base) winding, and (c) a voltage waveform of the capacitor 10 (at the point (a)). When the potential at the point (a) exceeds the voltage ($V_{BE}$) of the control transistor 7 owing to a current flowing across the light receiving section of the photodetector 12 and the resistor 9, the transistor 7 is turned ON and absorbs the base current of the main transistor 8, turning it OFF [FIG. 3(a)]. Neglecting losses in respective parts of the converter, the relationship between the output voltage Eo and the ON time $T_{ON}$ of the transistor 8 can be approximated as given by the following Eq. (1):

$$Eo = Ei \left( K_1 \frac{Ei}{Io} T_{ON} - K_2 \right) \quad (1)$$

where Ei is an input voltage, Io an output current, and $K_1$ and $K_2$ constants. Through control of the ON time $T_{ON}$ of the transistor 8 by suitably varying a current of a transistor of the photocoupler in accordance with the output voltage, it is possible to keep the output voltage Eo constant based on Eq. (1).

[Overcurrent Limiting Operation]

By effecting control for making the output voltage constant as mentioned above, the load current increases or the input voltage (Ei) decreases, causing an increase in the ON time ($T_{ON}$) of the main transistor 8 and a decrease in frequency. Accordingly, when the input voltage (Ei) is the lowest and the load current is at maximum ($Io_{MAX}$), the ON time ($T_{ON}$) becomes maximum ($T_{ONMAX}$). This is expressed by the following equation:

$$T_{ONMAX} = K_1 \frac{Io_{MAX}}{Ei} \left( \frac{Eo}{Ei} + K_2 \right) \quad (2)$$

If now the current of the light receiving section of the photocoupler 12 is set to be zero through the voltage detecting section A, the charging time constant of the capacitor 10 becomes maximum for a larger output current. Letting the ON time ($T_{ON}$) of the main transistor 8 at this time be represented by $T_{OC}$, it follows that:

$$T_{OC} > T_{ONMAX} \quad (3)$$

The time $T_{OC}$ will not increase no matter how much the load current is increased. Expressing these relations in terms of output voltage and current, there is obtained such an output characteristic as shown in FIG. 4. The load current increases up to the output current $I_{OC}$ corresponding to the time $T_{OC}$, but even if the load is further increased, the time $T_{ON}$ will not increase. After all, the embodiment of FIG. 2 presents such a foldback current limiting characteristic as depicted in FIG. 4. A voltage $E_{BN}$ [FIG. 3(a)] which is induced in the base winding in the reverse direction in FIG. 2 is proportional to the output voltage Eo, and hence is constant when the output voltage Eo is constant. On the other hand, a voltage $E_{BF}$ which is induced in the forward direction is proportional to the input voltage Ei; and so that the higher the input voltage Ei is, the shorter the charging time of the capacitor 10 becomes, causing a reduction of the time $T_{OC}$. Accordingly, by an optimum design of the voltages $E_{BF}$ and $E_{BN}$, it is possible to minimize a variation in the output current $I_{OC}$ caused by the input voltage.

FIG. 5 is a circuit diagram showing the principal part of another embodiment of the present invention, in which a control winding NC is provided separately of the base winding 11-1. In FIG. 2, since a voltage EB which is induced in the base winding 11-1 is also the base current source for the switching transistor 8, the provision of the control winding 11-2 offers an advantage that a desired voltage can be obtained.

Figure 6:
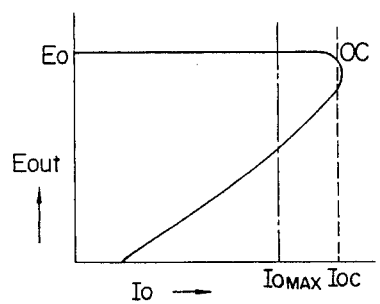

FIG. 6 shows the output voltage-current characteristic of the circuit of FIG. 2. As expressed by Eq. (1), the time $T_{ON}$ increases in proportion to the load current Io but does not exceed the load current $T_{OC}$ corresponding to the time $T_{OC}$; thus, the circuit presents what is called a foldback current limiting characteristic as shown. As described above, an output voltage control function and an overcurrent control function can easily be obtained with the abovementioned circuit. This circuit is effective especially when a change in the input voltage Ei is small, but when the change is large, the current $I_{OC}$ at a point OC cannot sufficiently compensate for the input voltage fluctuation.

This is attributable to the fact that in the vicinity of the point OC the capacitor 10 is charged only by a current flowing across the resistor 9 and stored charges of the capacitor 10 are also discharged via the resistor 9 during the OFF period of the RCC, and hence cannot sufficiently be discharged.

In view of the above, the present invention is to provide a converter which obviates the above-noted problem by changing the impedance of the charge-and-discharge path according to charging and discharging of the capacitor 10 and which is therefore effective for large input voltage fluctuation as well.

Figure 8:
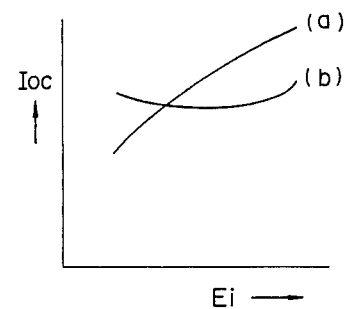
FIGS. 8 and 13 show a characteristic diagram explanatory of the input-output characteristic of the embodiment of the present invention.
Figure 7A:
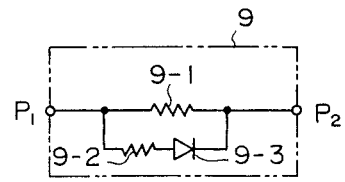
FIGS. 7A, 7B, 7C and 7D are circuit diagrams illustrating other examples of an impedance circuit employed in the present invention.
Figure 7B:
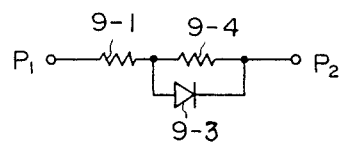
Figure 7C:
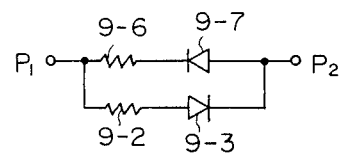
Figure 7D:
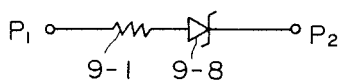

FIGS. 7A to 7D illustrate circuit diagrams of embodiments of the present invention for use as the impedance circuit 9 in FIG. 2, the parts corresponding to those in FIG. 2 being identified by the same reference characters. FIG. 7A shows the impedance circuit 9 which is formed by connecting the resistor 9-1 in parallel to a series circuit composed of a resistor 9-2 and diode 9-3. With the combined use of this impedance circuit 9 and the time constant circuit for the capacitor 10 in the control circuit section B in FIG. 2, the charging time constant is set by the resistor 9-1 and the discharging time constant is set by the resistor 9-2 and the diode 9-3 namely, the impedance is changed for ensuring sufficient discharging of the capacitor 10. FIG. 7B shows an arrangement in which a parallel circuit composed of a resistor 9-4 and the diode 9-3 is connected in series to the resistor 9-1. FIG. 7C shows an arrangement in which a pair of series circuits, each composed of a diode 9-7 (or 9-3) and a resistor 9-6 (or 9-2), are connected in anti-parallel fashion, the resistors 9-2 and 9-6 having different resistance values. FIG. 7D shows an arrangement which utilizes the difference between forward and backward impedance of a Zener diode. FIG. 8 is a graph showing the relationship between the input voltage and the current $I_{OC}$ (at the current limiting point OC) in the present invention. With the above-mentioned embodiments of FIGS. 7A through 7D, the influence of the input voltage on the current $I_{OC}$ (variations in the current $I_{OC}$ by the input voltage) can markedly be lessened as indicated by the characteristic curve (b). The curve (a) shows the characteristic of the example of (FIG. 2, from which it appears that fluctuations in the input voltage cause appreciable changes in the current $I_{OC}$ as referred to previously.

Figure 9:
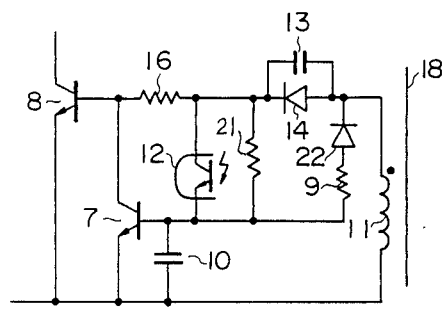
FIGS. 9 and 10 are circuit diagrams illustrating main parts of other embodiments of the present invention.
Figure 10:
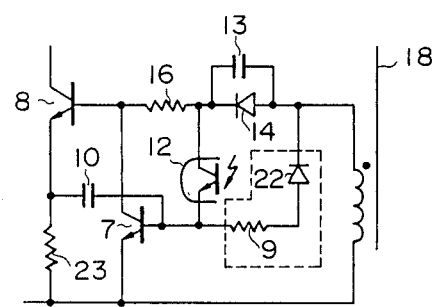
Figure 11:
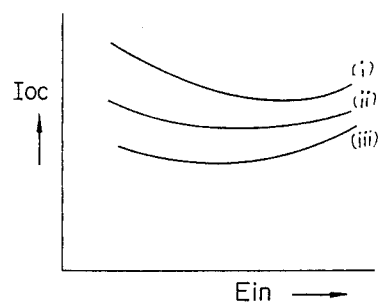
FIGS. 11 and 16 show a characteristic diagram explanatory of a characteristic of the embodiment shown in FIG. 10.

FIGS. 9 and 10 are circuit diagrams illustrating other embodiments of the present invention. In the circuit of FIG. 9 a discharging time constant circuit is formed by the echo preventing diode 14 connected to the base of the main transistor 8 and a resistor 21, and this time constant circuit is intended as a substitute for the series circuit of the diode 9-7 and the resistor 9-6 shown in FIG. 7C. In FIG. 10 a resistor 23 is connected to the emitter of the switching transistor 8 and the capacitor 10 is connected at one end to the emitter of the transistor 8. FIG. 11 shows the influence of the emitter resistor 23. An increase in the resistance value of the resistor 23 causes an increase in the rate at which the current decreases with a decrease in the input voltage. That is to say, FIG. 11 is a characteristic diagram showing the relationship between the input voltage Ei and the current $I_{OC}$ when the resistance value of the resistor 23 is selected to be (i)<(ii)<(iii). The curves (i), (ii) and (iii) show the characteristics for the resistance values (i), (ii) and (iii), respectively. In the above-described embodiments the parallel circuit of the diode 14 and the capacitor 13 may also be provided between the resistor 16 and the main transistor 8. In order to protect the photocoupler light receiving section (transistor) 12 from a reverse withstand voltage, it is possible to divide the base resistor 16 into two and to connect the midpoint to the collector of the transistor forming the photocoupler. Furthermore, it is evident that the same results as those mentioned above could be obtained by providing another winding (a control winding) in the output transformer so that a control voltage is created separately of the voltage which is generated in the feedback (base) winding.

Figure 12:
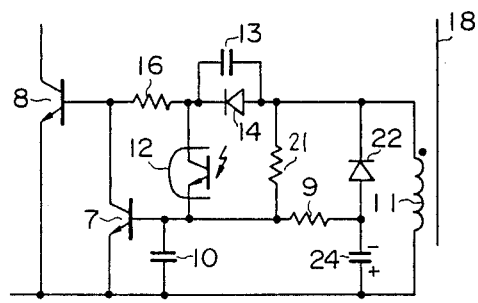
FIG. 12 is a circuit diagram illustrating a main part of another embodiment of the present invention.

FIG. 12 is a circuit diagram illustrating another embodiment of the present invention to improve the defect described with reference to FIG. 6, in which the parts corresponding to those in the example are identified by the same reference characteristics. As is evident from its comparison with the prior art example, the present invention is characterized in that a series circuit of a diode 22 and a capacitor 24 is connected across the feedback winding 11 and the connection point between the diode 22 and the capacitor 24 is connected via a resistor 9 to the base of the control transistor 7. With such an arrangement, the capacitor 24 is charged, in the indicated polarities, by a voltage which is induced in the feedback winding 11 during the OFF period of the main transistor 8, providing a negative voltage source for the capacitor 10. In the RCC which is controlled by a constant voltage, a reverse voltage which occurs in the feedback winding 11 during the OFF period of the main transistor 8 is substantially constant in proportion to the output voltage Eo, resulting in the negative voltage of the capacitor 24 also becoming almost constant. Since the negative voltage is stored in the capacitor 24 as mentioned above, charges which are stored in the capacitor 10 via the resistor 21 during the OFF period of the main transistor 8 are quickly discharged via the resistor 9 and the capacitor 24 during the ON period of the main transistor 8.

Figure 13:
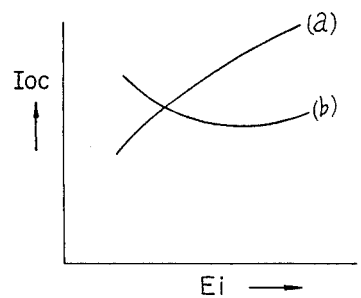

FIG. 13 is a graph showing the output characteristic of this embodiment, the abscissa representing the input voltage Ei and the ordinate the load current $I_{OC}$ (at the current limiting point). As indicated by the curve (b) in FIG. 13, according to the present invention, the current $I_{OC}$ does not greatly change but remains substantially constant in spite of a sharp fluctuation in the input voltage Ei. The curve (a) is the characteristic of the circuit of FIG. 2, showing that the current $I_{OC}$ varies with the fluctuation in the input.

Figure 14:
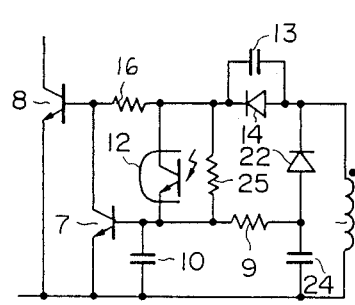
FIGS. 14, 15 and 17 are circuit diagrams each illustrating a main part of another embodiment of the present invention.
Figure 15:
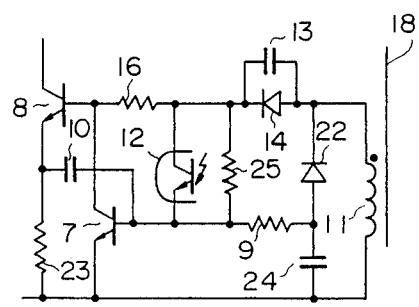
Figure 16:
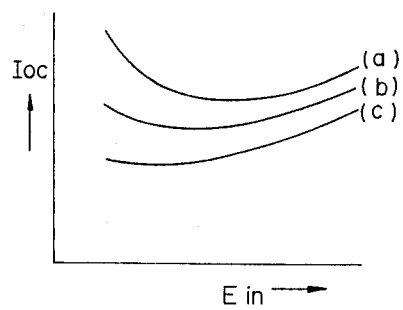
Figure 17:
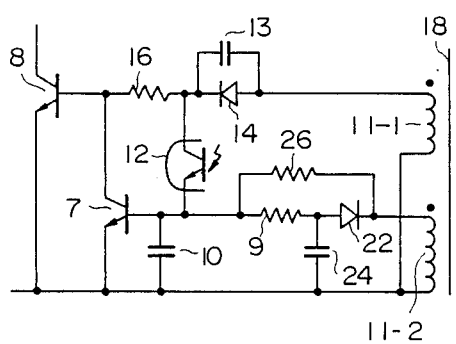

FIGS. 14, 15 and 17 are circuit diagrams illustrating other embodiments of the present invention. In FIG. 14 a resistor 25 is connected to the cathode side of the diode 14 in place of the resistor 21 connected to the anode side thereof in FIG. 12. This arrangement offers an advantage that the negative voltage of the capacitor 24 can be applied to the base of the transistor 8 via a route 16-25-9 during the OFF period of the RCC. In FIG. 15 a resistor 23 is connected to the emitter of the switching transistor 8 in FIG. 14 and the capacitor 10 is also connected at one end to the emitter of the transistor 8. FIG. 16 shows the influence of the emitter resistor 23 (FIG. 15). An increase in the value of the resistor 23 causes an increase in the rate at which the current $I_{OC}$ decreases with a decrease in the input voltage; namely, the variation in the current $I_{OC}$ with the fluctuation in the input voltage can be held small. That is to say, when the value of the resistor 23 is set to a<b<c, the output characteristic varies as indicated by (a), (b), and (c). FIG. 17 shows a circuit in which the control voltage is obtained with a winding (a control winding 11-2) provided separately of the feedback winding. In this case, the negative voltage of the capacitor 24 can be obtained at a desired value. The resistor 26 may also be connected to the winding 11-1 as in the case of FIG. 12, or it may also be connected to parallel to the photocoupler transistor 18 as in the case of FIG. 14. Moreover, an emitter resistor may be added in FIGS. 12, 14 and 17.

Figure 18:
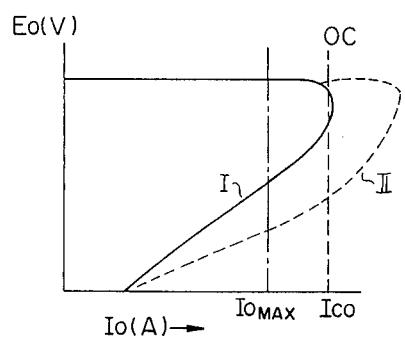
FIG. 18 is a characteristic diagram explanatory of a characteristic of embodiments of the present invention.

In case of commonly applying the circuit of the present invention to AC 100 volts source system and AC 200 volts source system, a current $I_{OC}$ of the point OC increases as shown by a curve II of FIG. 18 so that the current limiting function of the present invention cannot compensate for the variation of the input voltage. In my analysis, since the collector current of the control transistor 7 is a pulsive current, this cannot sufficiently control the base current of the main transistor 8 in case of a large scale of change (e.g. 100 volts to 200 volts) of the input AC voltage.

In accordance with the present invention, the above-mentioned problem can be solved by making the base current substantially constant for compensating for the changing range of the input voltage.

Figure 19:
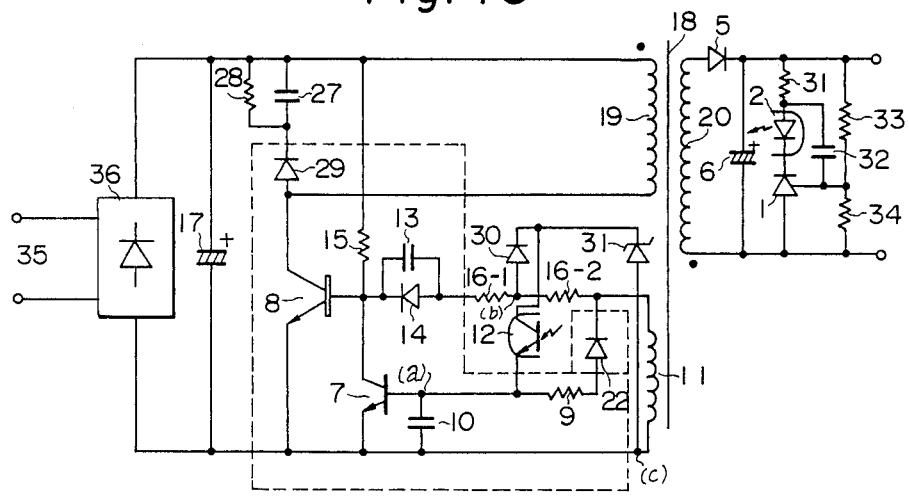
FIG. 19 is a circuit diagram illustrating another embodiment of the present invention.
Figure 20:
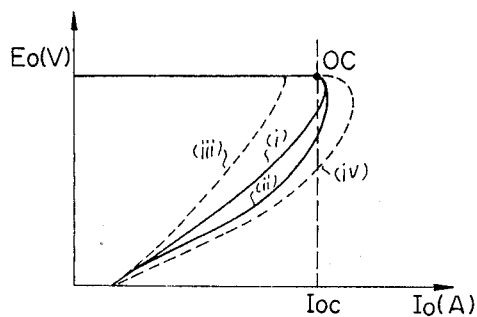
FIG. 20 is a circuit diagram explanatory of the characteristics of the embodiment of FIG. 19.

FIG. 19 is a circuit diagram illustrating an embodiment of the present invention, in which the parts corresponding to those in the prior art example are identified by the same reference characters. As is evident from its comparison with the prior art example, this embodiment has an arrangement in which dividing resistors 16-1 and 16-2 are connected between the base of the main transistor 8 and one end of the feedback winding 11 and a diode 30 and a constant-voltage diode 31 are connected between the connection point (b) of the resistors 16-1 and 16-2 and the other end (c) of the feedback winding NB. The diode 30 is provided for preventing a reverse current flow. FIG. 20 is a characteristic diagram showing the relationship between the output voltage (Eo) and the foldback current ($I_{oc}$) on the basis of the input voltage. The characteristic curves (i) and (ii) are characteristics obtained when the value (voltage) of the constant-voltage diode 31 is selected virtually appropriate. The curves (i) and (ii) are the foldback current limiting characteristics in the cases where the input voltages are supplied from 200-V and 100-V power sources, respectively, and in the both cases substantially the same foldback current appears. On the other hand, the curves (iii) and (iv) show characteristics in the cases where the input voltages from the 200-V and 100-V power sources are low. That is to say, when the voltage of the constant-voltage diode $DZ_2$ is set to a small value, the foldback current ($I_{OC}$) folds back before reaching the foldback point (OC) in the case of the input from the 200-V power source and folds back after reaching the foldback point (OC) in the case of the input from the 100-V power source. It has been confirmed that when the set value of the constant-voltage diode is gradually increased, substantially the same foldback current limiting characteristic is obtained in the both cases. Further, it has been confirmed experimentally characteristics (i) and (ii) are obtained by setting the voltage of the constant-voltage diode 31 to such a value that the diode hardly operates in the case of the input from the 100-V power supply but operates in the case of the input from the 200-V power supply. This is attributable to the fact that the base current of the main transistor 8 is held virtually constant mainly by the operation of the time constant circuit in the case of the 100-V input and by the operation of the constant-voltage diode 31 in the case of the 200-V input, respectively.

Figure 21:
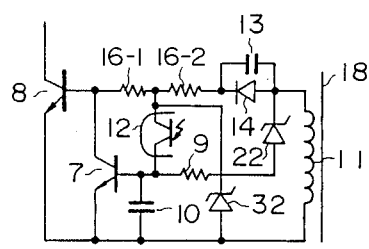
FIG. 21 is a circuit diagram illustrating another example of the main part of another embodiment of the present invention.

FIG. 21 is a circuit diagram illustrating another embodiment of the present invention, which differs from the above-described embodiment in that the parallel circuit composed of the capacitor 13 and the diode 14 is connected between the dividing resistor 16-2 and one end of the feedback winding 11. With this arrangement it is possible to dispense with the reverse current preventing diode 30 and perform its function by the diode 14.

The defect described with reference to FIG. 18 can be eliminated by a converter of the present invention which is arranged so that it detects the above-mentioned voltage, without insulation, by a transformer but possesses the abovenoted functions and which is designed to raise the precision of the output voltage and to protect circuit elements from an overcurrent.

Figure 22:
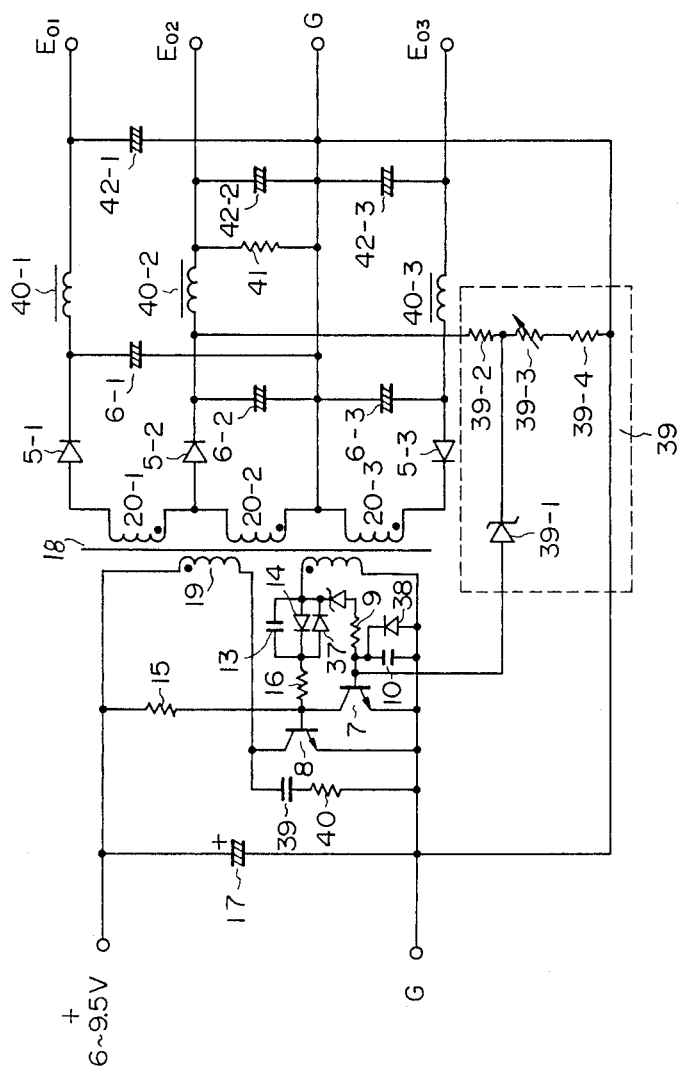
FIG. 22 is a circuit diagram illustrating another embodiment of the present invention.

FIG. 22 is a circuit diagram illustrating an embodiment of the present invention, in which the parts corresponding to those in the prior art example are identified by the same reference characters.

In FIG. 22 reference characters 20-1 to 20-3 indicate secondary windings of the transformer 18; 5-1 to 5-3 rectifying diodes; 6-1 to 6-3 and 42-1 to 41-3 smoothing capacitors; and 40-1 to 40-3 smoothing coils, these elements constituting a plurality of output circuits. Reference character V designates a voltage detecting circuit, which is shown, in this example, to detect the output voltage $E_{02}$ of one of the output circuits by resistors 39-2 and 39-4, a variable resistor $V_1$, and a constant-voltage diode 39-1 and to apply the detected voltage to the connection point between the capacitor 10 and the resistor 9 in the circuit on the primary winding side. Reference number 38 denotes a clamping diode connected across the capacitor 10 and 37 a diode connected to the reverse current blocking diode 14 in a plurality reverse therefrom, for clamping the voltage of the speeding-up capacitor 13. These elements constitute the circuit of the present invention. This circuit is substantially identical in operation with the prior art example. However, the voltage detecting circuit V does not employ the voltage detector 1 having incorporated therein a reference voltage source as the example of FIG. 2, but is arranged so that it applies the output of the constant-voltage diode 39-1 directly to the (+) terminal of the capacitor 10 to thereby adjust its charging time constant. Therefore, when the clamping diode 38 is not used, the base potential of the control transistor 7 changes greatly with load variations (from full to light load), incurring possibility of insufficient control of the output voltage. According to the present invention, however, since the potential of the (−) side of the capacitor 10 is limited by the clamping diode 38 to its voltage (VF) to reduce the variation in the base potential of the transistor 7, the precision of the output voltage can be raised significantly.

In the absence of the clamping diode 38, the base potential of the transistor 7 varies about 15% with the load variation from the full to light load; but the base potential variation could be reduced below 10% by the provision of the diode 38. Furthermore, when the clamping diode 37 is not employed, there is a fear of breakage of the main transistor 8 and other elements by an increase in the output current which occurs as a result of a voltage drop of the capacitor 10 when the output current folds back. The reason for this is that the voltage of the capacitor 13 differs according to the polarity in which it is charged (That is, the voltage of the capacitor 13 becomes equal to the voltage (VF) of the diode 14 or the feedback winding NB depending upon the voltage is applied to the diode 14 in the forward or backward direction.), causing a change in the base current of the main transistor 8 in the next cycle. According to the present invention, the clamping diode 37 is connected reverse in polarity from the reverse current blocking diode 14, by which the voltage of the capacitor 13 is set substantially constant regardless of its polarity, thus preventing an increase in the current flowing across the main transistor 8. The voltage (VF) of the clamping diode 37 needs to be higher than the base-emitter current (VBE) of the main transistor 8 so that no current flows from the starting resistor 15 into the diode 37. While in the above the present invention has been described to be applied to a multi-output type converter, it is evident that the invention is also applicable to a single-output type converter. Moreover, the clamping diode 37 may be provided as required.

As will be appreciated from the above, the present invention permits efficient control of the output voltage and the prevention of the output current from becoming excessively large, by the addition of a simple circuit.

Accordingly, the invention is of great utility when employed in a switching power source device. Moreover, in accordance with the present invention, the output voltage of RCC can be effectively limited to a constant value, while RCC of a substantially constant current limiting characteristic can be provided.

What I claim is:

1. A ringing choke converter comprising, an output transformer having a primary winding, a feedback winding and a secondary winding for outputting an output voltage, a main switching transistor having a collector connected to the primary winding and a base and an emitter connected to the feedback winding, a rectifying diode connected to the secondary winding, a control circuit comprising a control transistor connected between the base and the emitter of the main switching transistor, a time-constant circuit composed of a resistor and a capacitor connected across the feedback winding, a connection point between the resistor and the capacitor being connected to the base of the control transistor, and an adjusting circuit connected to the connection point for adjusting a charging time constant of said capacitor by application of a reverse voltage to the time-constant circuit proportional with an output voltage of the transformer.

2. A ringing choke converter according to claim 1, in which said feedback winding has a base winding and a control winding, said base winding being connected to the base and the emitter of the main switching transistor, said control winding being connected to the base and emitter of the control transistor, and further including a time constant circuit connected across the control winding.

3. A ringing choke converter comprising, an output transformer having a primary winding, a feedback winding and a secondary winding for outputting a voltage, a main switching transistor having a collector connected to the primary winding and having a base and a emitter connected across the feedback winding, a rectifying diode connected to the secondary winding, and a control circuit for the main transistor characterized in that the control circuit is provided with a control transistor connected between the base and the emitter of the main transistor, a time constant circuit having an impedance circuit and a capacitor connected across the feedback winding, means for connecting a connection point between the impedance circuit and the capacitor to the base of the control transistor, and an adjusting circuit for adjusting a charging time constant of the capacitor in accordance with the output voltage, and means for varying the impedance of said impedance circuit in accordance with the direction of current flow therethrough.

4. A ringing choke converter according to claim 3, in which the adjusting circuit is a photocoupler connected so that it supplies to the capacitor a current proportional to the output of the output voltage.

5. A ringing choke converter according to claims 3 or 4, in which the impedance circuit is a circuit in which a resistor is connected in parallel to a series circuit of a resistor and a diode.

6. A ringing choke converter according to claims 3 or 4, in which the impedance circuit is a circuit in which a resistor is connected in series to a parallel circuit of a resistor and a diode.

7. A ringing choke converter according to claims 3 or 4, in which the impedance circuit is a circuit in which a pair of series circuits, each composed of a diode and a resistor, are connected in an anti-parallel arrangement.

8. A ringing choke converter according to claims 3 or 4, in which the impedance circuit is a series circuit of a Zener diode and a resistor.

9. A ringing choke converter comprising an output transformer having a primary winding, a feedback winding and a secondary winding for outputting a voltage, a main switching transistor having a collector connected to the primary winding and having a base and an emitter connected across the feedback winding, a rectifying diode connected to the secondary winding, and a control circuit section for the main switching transistor, characterized in that the control circuit section is provided with a control transistor connected between the base and emitter of the main switching transistor, a Zener diode connected across the feedback winding, a time constant circuit composed of a resistor and a capacitor, circuit means for connecting a connection point between the resistor and the capacitor to the base of the control transistor, an adjusting circuit for adjusting a charging time constant of the capacitor in accordance with the output voltage, a series circuit composed of a divided resistor and a diode and connected between the main switching transistor and one end of the feedback winding, and a constant-voltage diode connected between the dividing point of the divided resistor and the other end of the feedback winding.

10. A ringing choke converter comprising an output transformer having a primary winding, a feedback winding and a secondary winding for outputting a voltage, a main switching transistor having a collector connected to the primary winding and having a base and an emitter connected across the feedback winding, a rectifying diode connected to the secondary winding, and a control circuit section for the main switching transistor, characterized in that the control circuit section is provided with a control transistor connected between the base and emitter of the main switching transistor, a time constant circuit composed of a Zener diode, a resistor, and a capacitor and connected across the feedback winding, circuit means for connecting a connection point between the resistor and the capacitor to the base of the control transistor, a voltage detecting circuit for detecting a DC output voltage from the rectifying diode, a circuit for applying the DC output voltage detected to the connection point, and a clamping diode connected across the capacitor.

11. A ringing choke converter according to claim 10, characterized in that a parallel circuit composed of a reverse current blocking diode and a speeding-up capacitor is connected between the base of the main transistor and one end of the feedback winding and the clamping diode is connected across the speeding up capacitor.

12. A ringing choke converter comprising, an output transformer having a primary winding, a feedback winding and a secondary winding for outputting an output voltage, a main switching transistor having a collector connected to the primary winding and a base and an emitter connected to the feedback winding, a rectifying diode connected to the secondary winding, a control circuit comprising a control transistor connected between the base and the emitter of the main switching transistor, a resistor connected in series with the emiter of the main switching transistor and a time constant circuit, the time constant circuit being composed of a resistor and a capacitor connected to one end of the feedback winding and a connection point between the resistor and the emitter of the main switching transistor, a connection point between the resistor and the capacitor of the time constant circuit being connected to the base of the control transistor, and an adjusting circuit connected to the last mentioned connection point for adjusting a charge time constant of said capacitor of the time constant circuit by application of a reverse voltage to the time-constant circuit proportional to an output voltage of the transformer.

* * * * *